Figure 1:
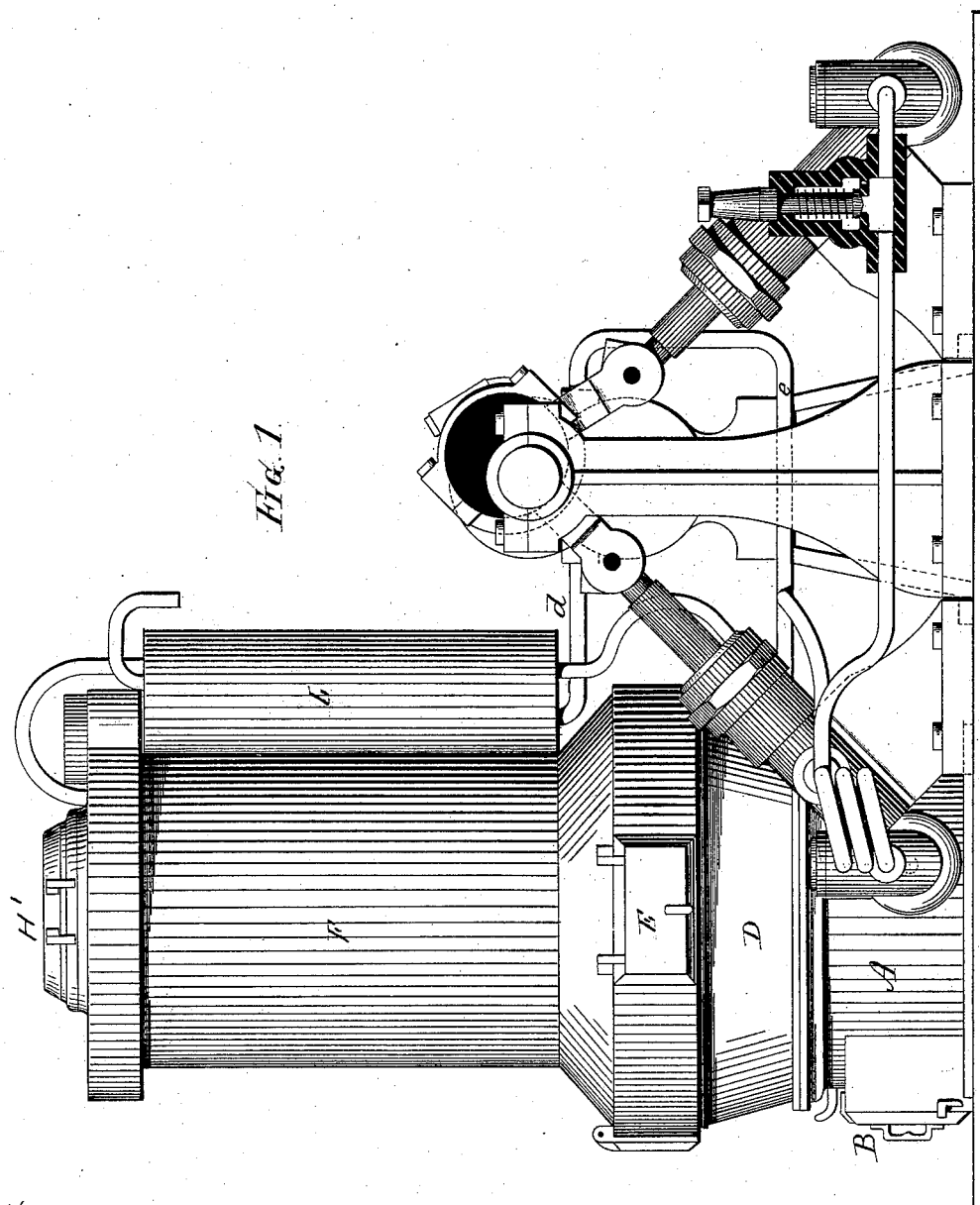

3 Sheets—Sheet 1.

W. P. TROWBRIDGE.
Water-Tube Steam-Generator.

No. 198,863.      Patented Jan. 1, 1878.

Witnesses:
J. H. Shumway
O. A. Kitson

Wm. P. Trowbridge
By atty Inventor
John E. Earle

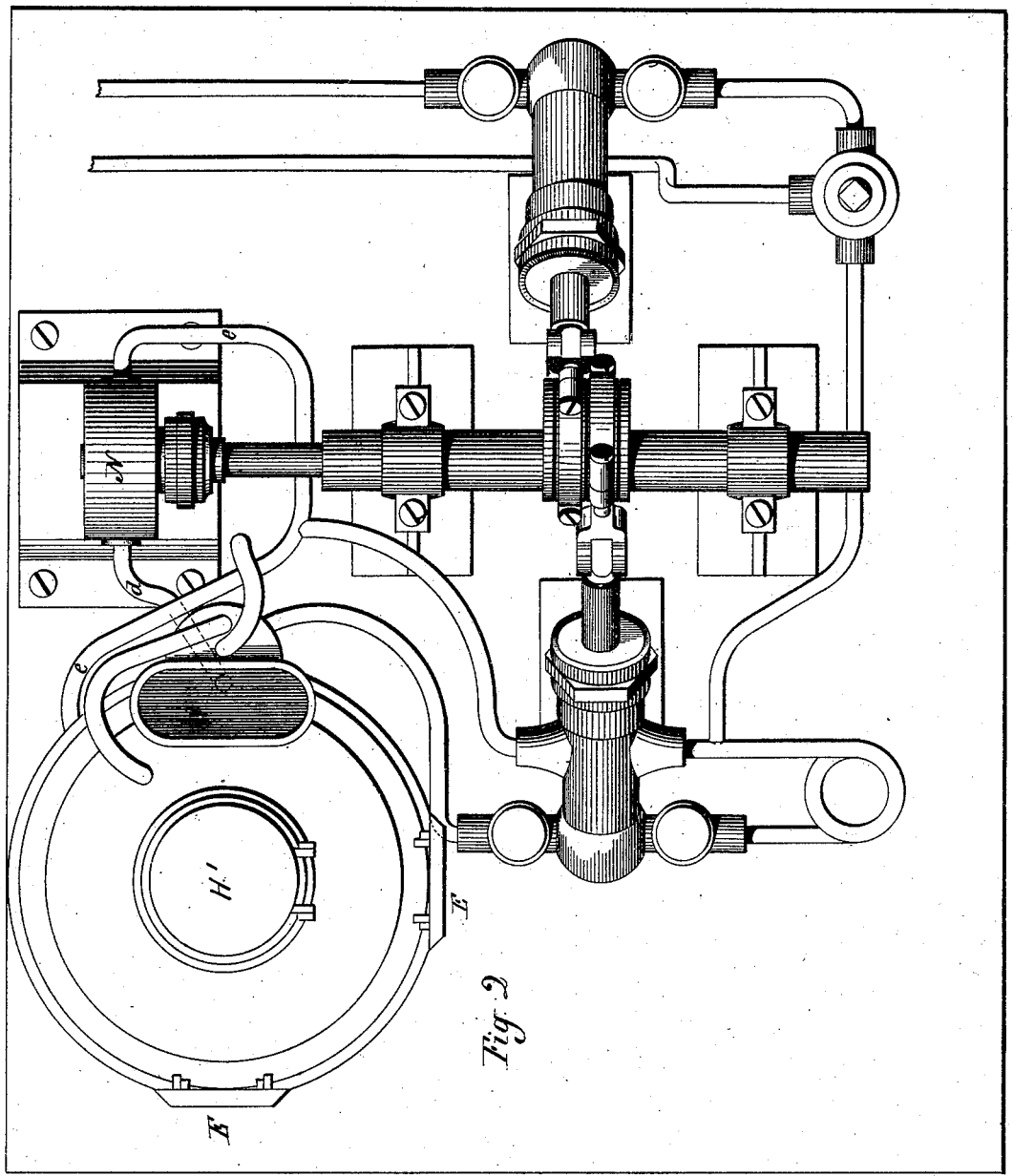

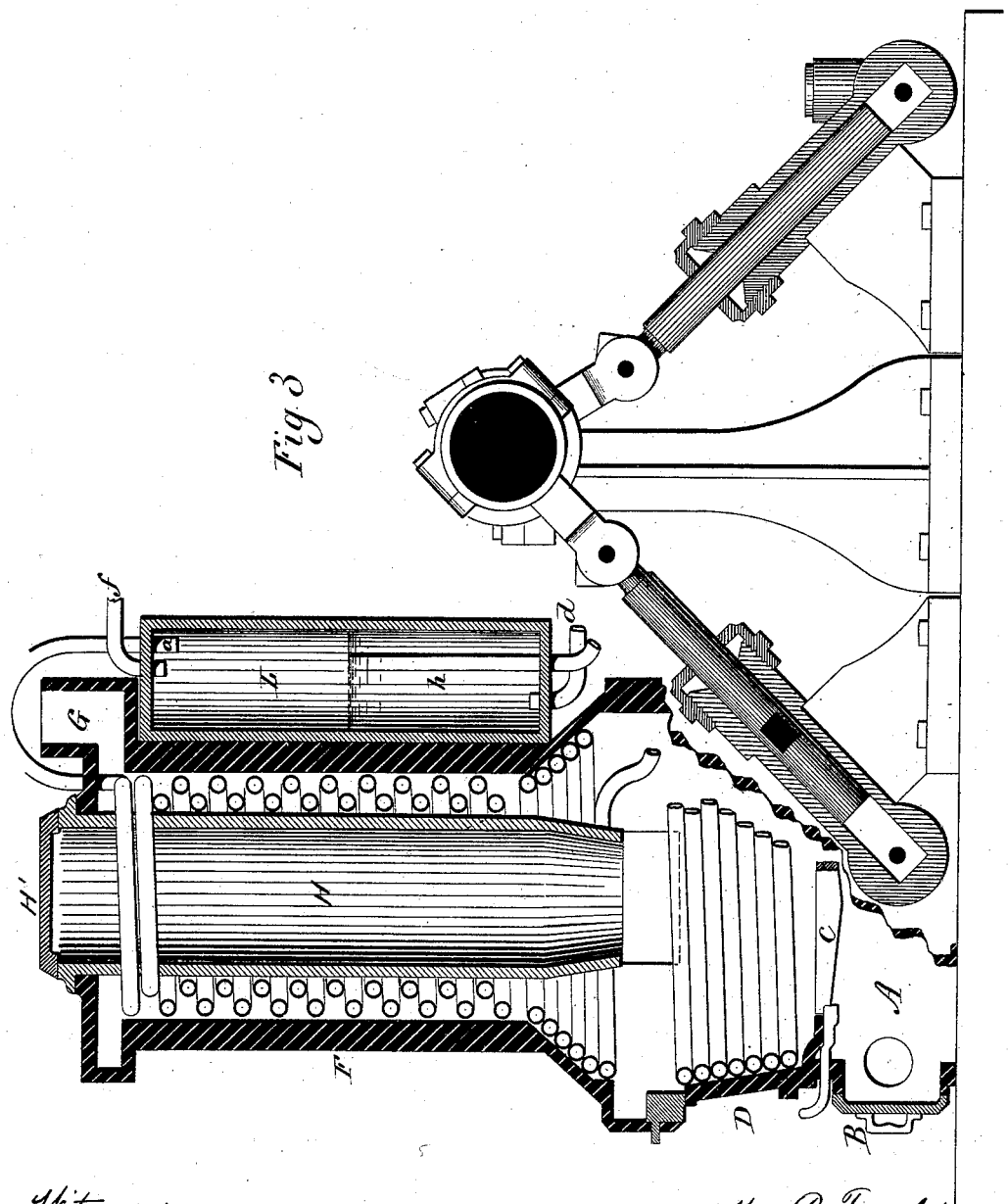

UNITED STATES PATENT OFFICE.

WILLIAM P. TROWBRIDGE, OF NEW HAVEN, CONNECTICUT, ASSIGNOR, BY MESNE ASSIGNMENTS, TO AUTOMATIC BOILER AND ENGINE COMPANY, OF SAME PLACE.

IMPROVEMENT IN WATER-TUBE STEAM-GENERATORS.

Specification forming part of Letters Patent No. 198,863, dated January 1, 1878; application filed November 22, 1877.

*To all whom it may concern:*

Be it known that I, WILLIAM P. TROWBRIDGE, of New Haven, in the county of New Haven and State of Connecticut, have invented a new Improvement in Water-Tube Steam-Generators; and I do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, plan; Fig. 3, vertical central section.

This invention relates to an improvement in water-tube steam-generators, with special reference to generators for small engines.

Some of the requisites for such a generator are, first, that it shall occupy a small space; second, that the amount of fuel required shall be small; and, third, that the generation of steam shall be rapid.

In the usual construction of boilers, if the amount of fuel be small, it requires frequent replenishing, and consequently the frequent opening of the fire-box for the introduction of fresh fuel, and which opening deadens the fire, as well as exposes the radiating-surface to the outward atmosphere, resulting in a sudden reduction of the pressure, which can only be overcome as the replenished fire reheats to generate new steam. Again, such construction of boilers necessitates the presence of a large quantity of water, and a considerable time with a fresh fire must elapse before the water would be sufficiently heated to generate steam.

The object of this invention is to overcome these difficulties; and it consists in a combination of parts in the apparatus, as hereinafter described, and more particularly recited in the claims.

The boiler is of the vertical class. The base A forms the ash-pit, with the usual opening B. Above this is the fire-grate C, which may be of any of the known constructions. Above this is the fire-box D, which is preferably of cylindrical form, increasing in diameter from the grate upward; and immediately above the fire-box are one or more openings, E, for convenience of examining the fire should occasion require. Above this open space the shell is contracted for a short distance, and then continues in a cylinder, F, of substantially equal diameter throughout, and closed at its top, and provided with an outlet, G, for the products of combustion. Centrally within the cylindrical shell F is a cylinder, H, of less diameter, and so as to leave a space between the two. This cylinder extends down to near the desired level of the fire, and is closed at its top by a cover, H'. The fuel is supplied through this cylinder, and the cylinder used as a reservoir, into which a considerable amount of fuel may be placed, to automatically supply fresh fuel to the fire as may be required, and in substantially the same manner as in what are called "base-burning stoves."

Around the fire-box is a coil of tubing, and this is continued up through the space between the inner and the outer cylinders, and near the top, as seen in Fig. 3. Preferably the coils are offset, as shown, so that succeeding coils are not exactly the one over the other, for the purpose of occupying the whole space, and bringing the hot gases as perfectly as possible into contact with the tube. This tube constitutes the water-space of the boiler.

Outside the boiler is a steam-chamber, L, of any desirable form. The upper end $a$ of the water-tube opens into the upper end of this chamber, so that the steam generated within the tube will pass into the said steam-chamber L.

In order to discharge the steam into the steam-chamber more rapidly than would be done by the circulation produced by the heat alone, there is combined with this coil a circulating-pump, N, (here represented as a rotary pump;) but any suitable pump may be employed for the purpose. From the lower part, or near the bottom, of the steam-chamber L, a pipe, $d$, leads to the pump, and from the pump a pipe, $e$, leads to the lowest part of the coil in the fire-box.

This pump is operated by power applied in any convenient manner, and drawing, as it does, from the chamber L, and discharging into the coil, it follows that a constant and forced circulation is produced within the coil, discharging into the chamber L.

Fire having been kindled in the fire-box, and the reservoir H charged with fuel, the coiled tubing filled with water is very quickly heated. The heat from the fire and products of combustion, passing upward through the space between the reservoir and the outer cylinder, confine the heat within that small space, and apply it directly to the successive coils, and the pump, in operation, forces the rapidly-heated water upward, and discharges it, with the steam therein, into the chamber L, where the steam at once separates from the water, the steam to be taken away by a pipe, $f$, or otherwise, for power or other purposes. This circulation carries the steam upward through the coil with very much greater rapidity than it could be discharged by natural circulation; and the constant circulation of the water, and drawing from the chamber L the water discharged therein, exposes the water to the intense heat of the fire under such forced circulation, and generates steam very much more rapidly than can be done without such circulation.

Because of automatically supplying the fuel to the reservoir H there is no occasion to open the fire-box, and consequently no liability of the sudden deadening of the fire and cooling the radiating-surface, as in the usual construction of steam-boilers; hence a constant heat may be maintained for any desired length of time. The replenishing of the reservoir should be made before the fuel therein has been exhausted.

As in this construction of boiler the water-tube will contain but a small quantity, it follows that the supply must be regular, and just sufficient to maintain a certain predetermined level. This may be done with a common force-pump, if the requisite care and attention be given to it; but to avoid the necessity of such constant care and attention there is combined with the apparatus an automatic feed, which acts to maintain a certain predetermined level, and so that, if the water in the boiler should rise above that predetermined level, the surplus would be at once removed from the boiler. If, on the other hand, the water should fall below said level, then the deficiency will be immediately supplied.

This is accomplished by the arrangement of a tube, $h$, opening into the chamber L at the actual water-line, so that if the water rises above that line it will be drawn out through the said tube $h$; and if below, then more water will be introduced through the said tubes, or at any other point. Any practical automatic feed may be employed for this purpose.

For convenience of illustration I have shown an automatic feed invented by Thos. W. Mather, and which is fully described in an application made by the said Mather, in even date herewith, and needs no further description in this case than the simple statement that it acts as an automatic feed, so as to draw from or introduce water to the boiler, so as to maintain a predetermined and positive level.

While the circulating-pump is desirable, and very greatly facilitates the practical operation of the boiler, it may be dispensed with, and a natural circulation depended upon to convey the steam from the coil.

It will be understood from the foregoing that it is not the intention in this application to claim, broadly, an automatic fire-feed; but that in using such an automatic feed there is combined a water-space, so as to concentrate the heat upon such water-space between the automatic feed and the outer shell.

What is claimed as new and useful, and desired to be secured by Letters Patent, is—

1. In a steam-generating apparatus, the combination of the fire-box, cylindrical shell above it, an inner fuel cylinder or reservoir, arranged so as to leave a space between the said shell and reservoir, a water-coil around said fire-box, extending upward and through said space, and an auxiliary chamber, into which the upper end of said coil conducts the steam, substantially as described.

2. In a steam-generating apparatus, the combination of the fire-box, cylindrical shell above it, an inner fuel cylinder or reservoir, arranged so as to leave a space between the said shell and reservoir, a water-coil around said fire-box, extending upward and through said space, an auxiliary chamber, into which the upper end of said coil conducts the steam, and a circulating-pump, taking the water from said auxiliary chamber and returning it to the lower part of the coil, substantially as described.

3. In a steam-generating apparatus, the combination of the fire-box, cylindrical shell above it, an inner fuel cylinder or reservoir, arranged so as to leave a space between the said shell and reservoir, a water-coil around said fire-box, extending upward and through said space, an auxiliary chamber, into which the upper end of said coil conducts the steam, and an automatic water-feeding device, substantially as described.

WILLIAM P. TROWBRIDGE.

Witnesses:
 W. J. MILLS,
 JOHN E. EARLE.